H. WATERS.
Blank for Hoe.

No. 62,456.

Patented Feb. 26, 1867.

Witnesses.
H. Gould
W. B. Gleason.

Inventor.
Harvey Waters

United States Patent Office.

HERVEY WATERS, OF BOSTON, MASSACHUSETTS.

*Letters Patent No. 62,456, dated February 26, 1867.*

IMPROVED BLANK FOR HOE.

*The Schedule referred to in these Letters Patent and making part of the same.*

TO ALL WHOM IT MAY CONCERN:

Be it known that I, HERVEY WATERS, of Boston, in the county of Suffolk, and State of Massachusetts, have invented an Improved Blank for Hoes, etc.; and I do hereby declare that the following, taken in connection with the drawings, which accompany and form part of this specification, is a description of my invention sufficient to enable those skilled in the art to practise it.

The invention relates principally to the manufacture of that class of hoes which have necks solid with the blades, the object of the invention being to substitute rolling for hammering in the manufacture of such hoes, and to insure greater accuracy of form, producing cheaper and better hoes than have been heretofore made.

The invention consists of a new blank or bar, (from which hoes and other articles may be produced mostly by rolling,) having the shanks for two blades drawn upon it, one at each end thereof, with the material for two blades (in connection) between the shanks, the disposition of the material being such that the said central portion thereof may be spread by rolling in direction at right angles to the line of the shanks by alternate passes upon each side of and from the line central, with and between the shanks, to the outside of the blades, the same being capable of being afterwards rolled doubly in the direction of the line of the shanks, but from the edges to and over the ears, instead of as formerly singly in the same line, but in opposite directions.

Figure 1:
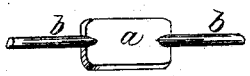

Figure 1 is a perspective view of the blank, the part $a$ being the portion from which two blades may be produced by rolling, $b\ b$ are the shanks integral therewith, and so positioned thereon that a line drawn from the centre of one shank to the centre of the other, at their points of connection with $a$, shall divide it into two equal parts at every section of said line, so that in spreading with the rolls and reducing to equal thickness on each side of the line, each part shall be the converse of the other part.

Figure 6:
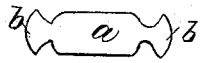

These blanks may be made in any convenient manner, but I prefer to make them by first cutting from a bar of suitable size sufficient material for two hoes, and having determined the relative proportions of that material respectively for shanks and blades, to proceed to make upon the piece, when heated, four incisions, as represented at fig. 6, where $a$ is the portion for the blades, and $b\ b$ the portions for the shanks. By means of a proper suit of die grooves in die rolls striking in and making the opposite incisions and working off over the end for each shank, the necks may be drawn with great accuracy and facility. It will be seen readily that blanks for shovels to be afterwards rolled out with a flat strap on each, instead of the round shank, as in hoes, may be made upon substantially the same principle.

I claim a blank made substantially as described, and as shown in fig. 1.

In witness whereof I have hereunto set my hand this seventh day of October, A. D. 1865.

HERVEY WATERS.

Witnesses:
F. GOULD,
W. B. GLEASON.